United States Patent Office 3,106,976
Patented Oct. 15, 1963

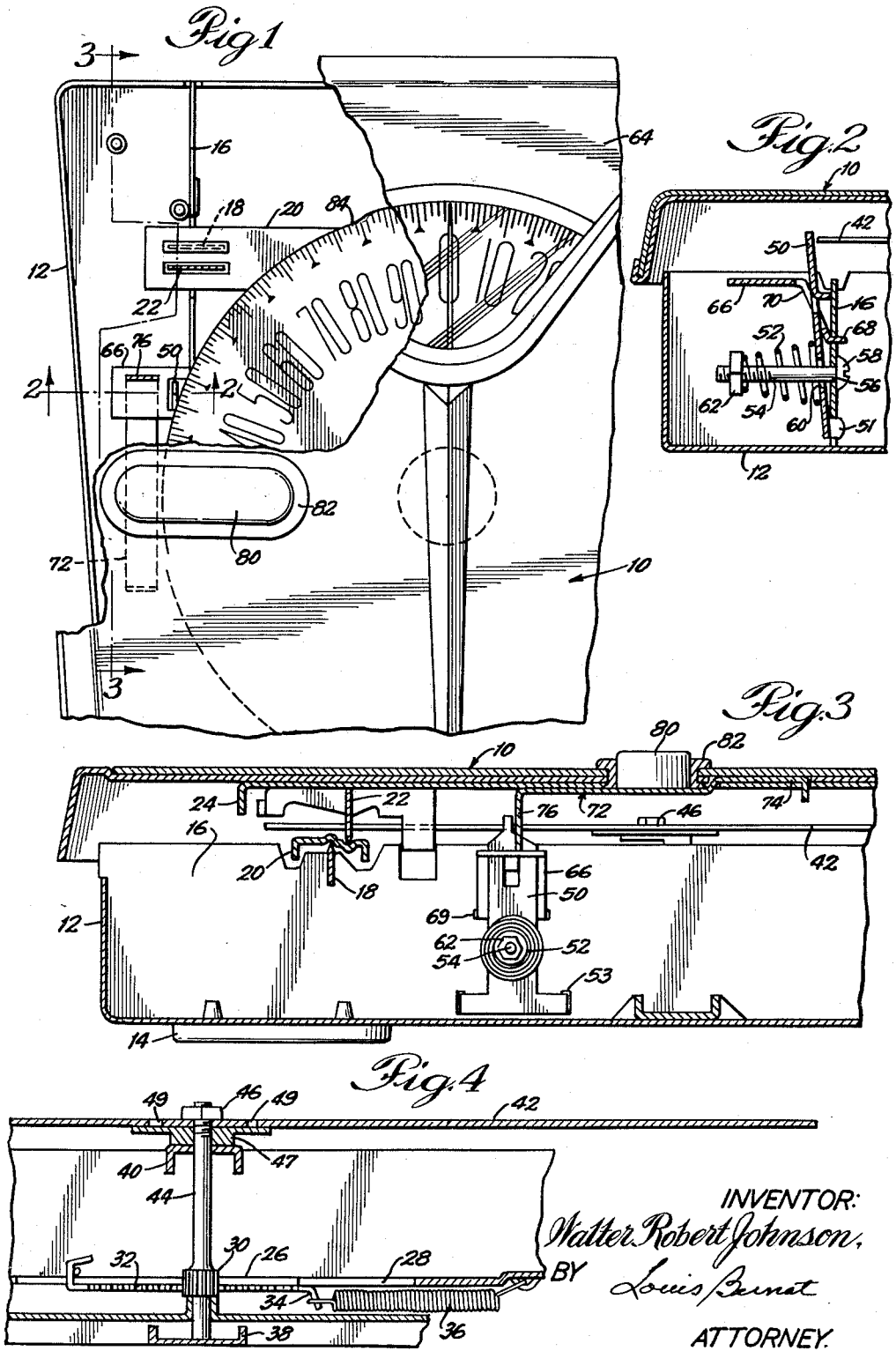

3,106,976
WEIGHING SCALE
Walter Robert Johnson, Chicago, Ill., assignor to The Borg-Erickson Corporation, Chicago, Ill., a corporation of Illinois
Filed May 16, 1962, Ser. No. 195,101
9 Claims. (Cl. 177—159)

This invention relates generally to weighing scales and more particularly to a new and improved weighing scale having novel means for locking the weight indicating dial in indicating position to permit the weight of an object to be read after the object is removed from the scale.

It will be appreciated that there are many instances where it is highly advantageous to hold the dial of a weighing scale in its weight indicating position so that the weight of an object can be checked after the object is removed from the scale platform. This is particularly desirable in weighing scales of the portable type in which the dial is positioned beneath the platform so as to be viewable through a window provided in the platform.

Attempts have been made in the prior art to provide a suitable dial locking means but such previous devices have not proved entirely satisfactory. For example, the dial locking means disclosed in the patent to Greenleaf No. 2,308,874 comprises a wing nut on the exterior housing of the scale which requires manual actuation to lock the dial in weight indicating position. The dial locking means disclosed in the patent to Juhasz No. 2,446,332 comprises a dial of magnetic material operatively associated with a pivotally supported permanent magnet so that the dial can be held in weight indicating position by the magnet until the latter is released to permit the dial to return to its zero or no-weight position.

It is a general object of this invention to provide a new and improved dial locking means for a weighing scale which overcomes some of the difficulties of the prior art devices.

It is another object of this invention to provide such an improved dial locking means having a locking member adapted to be resiliently urged against the periphery of the dial to maintain the latter in its weight indicating position which eliminates the need for the manually actuated locking wing nut of the prior art devices.

It is still another object of the invention to provide a new dial locking means for a weighing scale, as above, in which the resiliently urged locking member is adapted to be selectively actuated to release the dial from a weight indicating locking position by novel release means provided on the scale platform to enable operation by the foot of a person standing on such platform.

It is a further object of this invention to provide a new and improved dial locking means for a weighing scale which is characterized by its effectiveness and ease of use, its relative simplicity, and its comparatively low cost of construction and maintenance.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a plan view of one illustrative embodiment of a weighing scale in accordance with the invention which has been partially broken away to illustrate the novel locking feature;

FIGURE 2 is a cross-sectional view of the novel locking feature taken substantially as shown on line 2—2 of FIGURE 1;

FIGURE 3 is a cross-sectional view of the illustrative embodiment of the invention taken substantially as shown on line 3—3 of FIGURE 1; and FIGURE 4 is a side elevational view, in cross-section, and partially broken away, showing the dial actuating portion of the weighing scale.

Referring now to the drawing, there is shown one particular illustrative weighing scale arrangement embodying the principles of the present invention. This illustrative embodiment comprises a weighing scale having an upper weight receiving platform 10 superposed in movable relation with a pan-shaped housing 12. The pan-shaped housing 12, in accordance with well known practices, may be provided with suitable resilient support feet 14 for enabling the weighing scale to be positioned upon a floor or any other flat surface in weight receiving position.

The weighing scale generally comprises the conventional weighing and indicating elements familiar to those skilled in the art. For example, the weighing scale may be provided with a plurality of upright, rigid frame rails 16 carrying knife edge bearing members 18 at selected points thereon. Thus, as particularly shown in FIGURES 1 and 3, each knife edge bearing member 18 pivotally supports a rocker member 20 which, in turn, is pivotally engaged, by a knife edge pivot member 22 secured to a flange 24 affixed to the undersurface of the weighing platform 10. Thus, the downward movement of the platform 10 in response to a weight being placed thereon causes the rocker members 20 to be pivotally actuated between the knife edge pivot member 22 and knife edge bearing 18.

The pivotal movement of the rocker member 20 is transmitted, through suitable linkages (not shown) in accordance with well-known practices, to an elongated equalizer plate 26 which is disposed for horizontal movement adjacent the bottom of the pan-shaped housing 12. The equalizer plate 26 is provided with an opening 28 for receiving a pinion 30 meshed with a reciprocal rack 32. The reciprocal rack 32 is secured by a hook 34 at one end to a tension spring 36 and is slidably movable at its other end, against the tension of spring 36 upon rotation of pinion 30. When the equalizer plate 26 is horizontally actuated after a weight is placed on the weight receiving platform 10, the corresponding movement of the reciprocal rack 32 rotates the pinion 30 in its bearings, at the channel member 38 and cross bar 40, to rotate the indicating dial plate 42 an amount representative of the weight on platform 10. The dial plate 42 is coupled to the pinion 30 by means of a shaft 44, fastener nut 46 and the hub 47 which is provided with the upstanding pins 49 that mate with corresponding holes in the dial plate.

In accordance with a feature of this invention, the dial plate 42 is adapted to be engaged by a lock finger 50 which is pivotally supported on the frame rail 16 as by means of the lock finger flanges 51 extending through the openings 53 in the frame rail. As particularly shown in FIGURES 2 and 3, the lock finger is adapted to engage the peripheral edge of dial plate 42 due to the resilient bias force provided against the lock finger 50 by the compression spring 52. In this illustrative embodiment, an elongated, threaded screw member 54 is positioned through an opening 56 in the frame rail 16, with the head 58 of the screw member 54 serving to hold the screw member 54 against the frame rail. The screw member 54 also is inserted through an opening 60 in the lock finger 50 and the compression spring 52 is positioned between the lock finger 50 and a nut 62 threaded on the remote end of the screw fastener 54. It will be appreciated that the spring 52 normally biases the lock finger 50 against the peripheral edge of the dial plate 52 to frictionally engage the dial plate and hold it in the weight indicating position, so that the weight of the object can be seen on the dial plate 42 through the window 64 provided in the platform 10, even after the weight is removed from the platform 10.

In accordance with a further feature of this invention, an angled release lever 66 is pivotally mounted on the frame rail 16, as by the flange portion 68 extending through an opening 69 in the frame rail, and the release lever is provided with a suitable central opening 70 through which the lock finger 50 extends. It can be seen that when the release lever 66 is depressed so as to be pivoted outwardly from the frame rail 16, it serves to hold the lock finger 50 away from the dial plate 42 and against the bias of the spring 52.

In the use of the inventive weighing scale, a trip member 72 is secured at one end 74 to the weighing platform 10, by any suitable means, such as clamping or the like, and is provided with a flange portion 76 at its other end positioned in actuating relationship with the trip spring 66. The weighing platform 10 is provided with a suitable opening within which a trip button 80 is positioned for slidable movement in a shaped bezel 82. Thus, when the trip button 80 is depressed, it depresses the flange 76 of the trip spring 72 to move the release lever 66 downwardly and thereby release the lock finger 50 from the dial plate 42 in the manner explained hereinabove.

The operation of the invention can now be fully understood. When a person to be weighed steps upon the weighing platform 10, the scale operates in a normal manner and the dial plate 42 rotates to indicate the weight in accordance with the downward movement of the weighing platform. The lock finger 50 is urged against the peripheral edge of dial plate 42 to frictionally hold the dial plate 42 in the weight indicating position so that the person, or any other object being weighed, can be removed from the weighing platform 10 with the weight still indicated on the dial plate through the viewing window 64. After the weight is read, or it is no longer desirable to maintain the dial plate 42 in a weight indicating position, the trip button 80 is depressed, as by the foot or manually, to release the dial plate 42 and permit it to return to the zero weight position. In accordance with a feature of this invention, a portion of the peripheral edge of the dial plate 42 is relieved or cut away, as at 84, to be out of engageable contact with the locking finger 50 to thereby permit free movement of the weight indicator disk in the zero weight portion of its range. This facilitates the zero adjustment of the weight indicating dial plate 42 and permits proper action thereof in the low weight range.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. In a weighing scale comprising the combination of a housing base, a weight platform, a movable weight indicator disk having an indicia bearing dial on one face of said disk visible from a position outside of said weight platform, weighing mechanism supporting said weight platform yieldingly on said base and being operatively connected to said indicator disk for movement relative to said base and platform in response to the application of weight on said platform, the improvement of dial locking means for maintaining said indicia bearing dial in a weight indicating position after the weight is removed from said platform, said dial locking means comprising a locking finger pivotally connected at one end to a wall of the housing base, spring means normally urging the other end of said locking finger into frictional engagement with the peripheral edge of indicator disk for locking the disk in a weight indicating position, release means adapted when depressed to move the locking finger out of engagement with the peripheral edge of the indicator disk, and a release button supported on said weight platform for transverse movement therethrough, said release button being in operative contact with said release means such that the depression of said release button in the weight platform depresses the release lever to move the locking finger from said weight indicator disk.

2. In a weighing scale comprising the combination of a housing base, a weight platform, a movable weight indicator disk having a weight indicia bearing dial on one face of said disk visible from a position outside of said weight platform, weighing mechanism supporting said weight platform yieldingly on said base and being operatively connected to said indicator disk for movement relative to said base and platform in response to the application of weight on said platform, the improvement of dial locking means for maintaining said indicia bearing dial in a weight indicating position after the weight is removed from said platform, said dial locking means comprising a locking finger pivotally connected at one end to a wall of the housing base, spring means normally urging the other end of said locking finger into frictional engagement with the peripheral edge of indicator disk for locking the disk in a weight indicating position, release means adapted when depressed to move the locking finger out of engagement with the peripheral edge of the indicator disk, and a release button supported on said weight platform for transverse movement therethrough, said release button being in operative contact with said release means such that the depression of said release button in the weight platform depresses the release lever to move the locking finger from said weight indicator disk, said weight indicator disk being formed with a cutaway portion along its peripheral edge to provide freedom of movement in the zero reading range of said indicia bearing dial.

3. In a weighing scale comprising the combination of a housing base, a weight platform, a movable weight indicator disk having an indicia bearing dial on one face of said disk visible from a position outside of said weight platform, weighing mechanism supporting said weight platform yieldingly on said base and being operatively connected to said indicator disk for movement relative to said base and platform in response to the application of weight on said platform, the improvement of dial locking means for maintaining said indicia bearing dial in a weight indicating position after the weight is removed from said platform, said dial locking means comprising a locking finger normally urged into frictional engagement with the peripheral edge of indicator disk for locking the disk in a weight indicating position, release means adapted when depressed to move the locking finger out of engagement with the peripheral edge of the indicator disk, and a release button supported on said weight platform for transverse movement therethrough into operative contact with said release lever such that the depression of said release button in the weight platform depresses the release means to remove the locking finger from said weight indicator disk.

4. In a weighing scale comprising the combination of a housing base, a weight platform, and a movable weight indicia bearing disk positioned for movement relative to said base and platform in response to the application of weight on said platform, the improvement of dial locking means for maintaining said indicia bearing disk in a weight indicating position after the weight is removed from said platform, said dial locking means comprising a locking member, spring means normally urging said locking member into engagement with the indicia bearing disk for locking the disk in a weight indicating position, release means adapted when depressed to move said locking member out of engagement with the indicia bearing disk, and a release button supported on said weight platform for transverse movement therethrough into operative contact with said release means such that the depression of said release button in the weight platform causes the locking finger to be removed from said indicia bearing disk.

5. In a weighing scale in accordance with claim 4 wherein said indicia bearing disk is formed with a cutaway portion along a peripheral edge thereof so as to be out of engageable contact with said locking member to permit free movement of the indicia bearing disk in at least a portion of its range.

6. In a weighing scale comprising the combination of a housing base, a weight platform, a movable weight indicator disk having an indicia bearing dial on one face of said disk visible from a position outside of said weight platform, weighing mechanism supporting said weight platform yieldingly on said base and being operatively connected to said indicator disk for movement relative to said base and platform in response to the application of weight on said platform, the improvement of dial locking means for maintaining said indicia bearing dial in a weight indicating position after the weight is removed from said platform, said dial locking means comprising a locking finger pivotally connected at one end to the housing base, spring means normally urging the other end of said locking finger into frictional engagement with the peripheral edge of indicator disk for locking the disk in a weight indicating position, a release lever pivotally secured to the weight platform and adapted when depressed to move the locking finger out of engagement with the peripheral edge of the indicator disk, and a release button supported on said weight platform for transverse movement therethrough, said release button being in operative contact with said release lever such that the depression of said release button in the weight platform depresses the release lever to remove the locking finger from said weight indicator disk.

7. In a weighing scale comprising the combination of a housing base, a weight platform, a movable weight indicator disk having an indicia bearing dial on one face of said disk visible from a position outside of said weight platform, weighing mechanism supporting said weight platform yieldingly on said base and being operatively connected to said indicator disk for movement relative to said base and platform in response to the application of weight on said platform, the improvement of dial locking means for maintaining said indicia bearing dial in a weight indicating position after the weight is removed from said platform, said dial locking means comprising a locking finger pivotally connected at one end to a wall of the housing base, spring means normally urging the other end of said locking finger into frictional engagement with the peripheral edge of indicator disk for locking the disk in a weight indicating position, a release lever pivotally secured to a wall of the housing base and adapted for operative contact with said locking finger, a trip spring pivotally secured to the weight platform to operate the release lever against the locking finger to move the latter out of engagement with the peripheral edge of the indicator disk, and a release button supported on said weight platform for transverse movement therethrough, said release button being in operative contact with said trip spring such that the depression of said release button in the weight platform causes the locking finger to be removed from said weight indicator disk.

8. In a weighing scale in accordance with claim 7 wherein said weight indicator disk is formed with a cutaway portion along a peripheral edge thereof so as to be out of engageable contact with said locking finger to permit free movement of said weight indicator disk in at least a portion of its range.

9. In a weighing scale comprising the combination of a housing base, a weight platform, a movable weight indicator disk having an indicia bearing dial on one face of said disk visible from a position outside of said weight platform, weighing mechanism supporting said weight platform yieldingly on said base and being operatively connected to said indicator disk for movement relative to said base and platform in response to the application of weight on said platform, the improvement of dial locking means for maintaining said indicia bearing dial in a weight indicating position after the weight is removed from said platform, said dial locking means comprising a locking finger pivotally connected at one end to the housing base, spring means normally urging the other end of said locking finger into frictional engagement with the peripheral edge of indicator disk for locking the disk in a weight indicating position, a release lever pivotally secured to the weight platform and adapted when depressed to move the locking finger out of engagement with the peripheral edge of the indicator disk, and a release button supported on said weight platform for transverse movement therethrough, said release button being in operative contact with said release lever such that the depression of said release button in the weight platform depresses the release lever to remove the locking finger from said weight indicator disk.

References Cited in the file of this patent

UNITED STATES PATENTS

| 253,659 | Atwater | Feb. 14, 1882 |
| 2,308,874 | Greenleaf | Jan. 19, 1943 |
| 2,446,332 | Juhasz | Aug. 3, 1948 |